(12) United States Patent  
Cunningham et al.

(10) Patent No.: US 8,295,706 B2  
(45) Date of Patent: Oct. 23, 2012

(54) TECHNIQUE FOR SIMULTANEOUSLY TRANSMITTING WIDE AND NARROW OPTICAL BEACON SIGNALS

(75) Inventors: James A. Cunningham, Dayton, OH (US); David R. Wickholm, Beavercreek, OH (US); Dean S. Grinch, Dublin, OH (US); Daniel L. Baber, Hamilton, OH (US)

(73) Assignee: Exelis Inc., McLean, VA (US)

( * ) Notice: Subject to any disclaimer, the term of this patent is extended or adjusted under 35 U.S.C. 154(b) by 355 days.

(21) Appl. No.: 12/776,941

(22) Filed: May 10, 2010

(65) Prior Publication Data

US 2011/0274434 A1 Nov. 10, 2011

(51) Int. Cl.
H04B 10/10 (2006.01)

(52) U.S. Cl. .................................. 398/131; 398/122

(58) Field of Classification Search .............. 398/122, 398/129, 131
See application file for complete search history.

(56) References Cited

U.S. PATENT DOCUMENTS

| | | | |
|---|---|---|---|
| 6,347,001 B1 * | 2/2002 | Arnold et al. ............... | 398/122 |
| 7,609,972 B2 | 10/2009 | Cunningham et al. | |
| 2003/0142983 A1 * | 7/2003 | James et al. ................ | 398/107 |
| 2007/0031151 A1 | 2/2007 | Cunningham et al. | |

OTHER PUBLICATIONS

Petrovich, D.J. et al.: "Demonstration of a high-altitude laser crosslink", Aerospace Conference Proceedings, 2000 IEEE, Mar. 18-25, 2000, Piscataway, NJ, USA, IEEE, vol. 3, Mar. 18, 2000, pp. 67-77.
European Search Report in corresponding Application No. 11162399.7, mailed Aug. 23, 2011.

* cited by examiner

*Primary Examiner* — Leslie Pascal
(74) *Attorney, Agent, or Firm* — Edell, Shapiro & Finnan, LLC (57) ABSTRACT

A technique for simultaneously transmitting wide and narrow optical beacon signals includes generating a laser beam and splitting the laser beam into a first signal on a first path and a second signal on a second path via a wavelength-dependent beamsplitter. A wide beacon signal having a first beam divergence is generated from the first signal, and a narrow beacon signal having a second, lesser beam divergence is generated from the second signal. The wavelength of the laser beam determines an allocation of the laser energy between the wide and narrow beacon signals based on transmittance/reflectance characteristic of the beamsplitter at that wavelength. The wide and narrow beacon signals are simultaneously transmitted in a overlaid manner into free space to support acquisition and tracking in a free-space optical communication system. The beamsplitter can simultaneously transmit or reflect substantially all of a data signal at a different wavelength.

17 Claims, 4 Drawing Sheets

TECHNIQUE FOR SIMULTANEOUSLY TRANSMITTING WIDE AND NARROW OPTICAL BEACON SIGNALS

BACKGROUND

Free-space optical communication systems are capable of transmitting data at very high data rates over long distances. Acquisition schemes and precise beam pointing and tracking capabilities are required to communicate between moving platforms (e.g., airborne, space, and ground vehicles). Particularly with airborne platforms, where movement of aircraft can be rapid and unpredictable, it is critical that the pointing and tracking scheme provide accurate guidance for directing the data laser beams.

In two-way communications between optical communication terminals, the angular direction of a far-end terminal can be acquired and tracked by determining the angle of arrival of a signal transmitted by the far-end terminal. A dedicated beacon signal that is distinct from the data signal conveying data can be transmitted for the purpose of determining angular direction. One option is to use a single beacon signal with a fixed beam divergence. Another option is to switch the beacon laser energy between two sets of optics that sequentially produce a wide beamwidth beacon signal and a narrow beamwidth beacon signal.

Generally, a wide beamwidth signal is advantageous for initial acquisition due to the higher likelihood of detection within a given angular search region. Further, once a communication link has been established between terminals, a beacon signal with a wide beamwidth is less likely to lose track of a far-end terminal when the relative angular direction of the terminals is changing rapidly, since either terminal can fairly quickly move out of a narrower beam. Nevertheless, a narrower beamwidth signal is desirable for ongoing tracking due to its higher pointing accuracy and greater signal strength.

The disadvantage of using a single, fixed-divergence beacon signal is that the beamwidth must be selected to make a tradeoff between the aforementioned acquisition benefits of a wide beamwidth signal and the tracking benefits of a narrow beamwidth signal. For a beacon system that switches between wide and narrow beamwidths, there is likely a period of time during the switch over between the two beacon signals when there is no beacon signal being emitted, which can result in disruptions during acquisition and tracking. Accordingly, there remains a need for improved beacon systems for supporting free-space optical communications.

SUMMARY

A technique for simultaneously transmitting wide and narrow optical beacon signals includes generating a beacon laser beam and splitting the beacon laser beam into a first signal on a first path and a second signal on a second path via a wavelength-dependent beamsplitter. A wide beacon signal having a first beam divergence is generated from the first signal, and a narrow beacon signal having a second, lesser beam divergence is generated from the second signal. The wavelength of the beacon laser beam determines an allocation of the laser energy between the wide and narrow beacon signals based on transmittance/reflectance characteristic of the beamsplitter at the beacon wavelength. The wide and narrow beacon signals are simultaneously transmitted in an overlaid manner into free space to support acquisition and tracking in a free-space optical communication system.

Since the transmission/reflection characteristics of the beamsplitter vary as a function of wavelength, where the beacon laser beam is generated by a tunable laser module, the allocation of energy between the wide and narrow beacon signals can be adjusted as desired by adjusting the wavelength of the beacon laser beam. Consequently, almost all, some, or almost none of the energy of the beacon laser beam can be apportioned to either of the wide and narrow beacon signals. According to another option, a fixed-wavelength laser module can be used to provide a fixed allocation of energy between the wide and narrow beacon signals.

The beacon laser beam can be combined with a data laser beam having a different wavelength, such that the combined beacon and data laser beam impinges on the beamsplitter. In this case, the beamsplitter can direct substantially all of a data laser beam to the second path or another path, such that the data signal is transmitted simultaneously along with the wide and narrow beacon signals.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
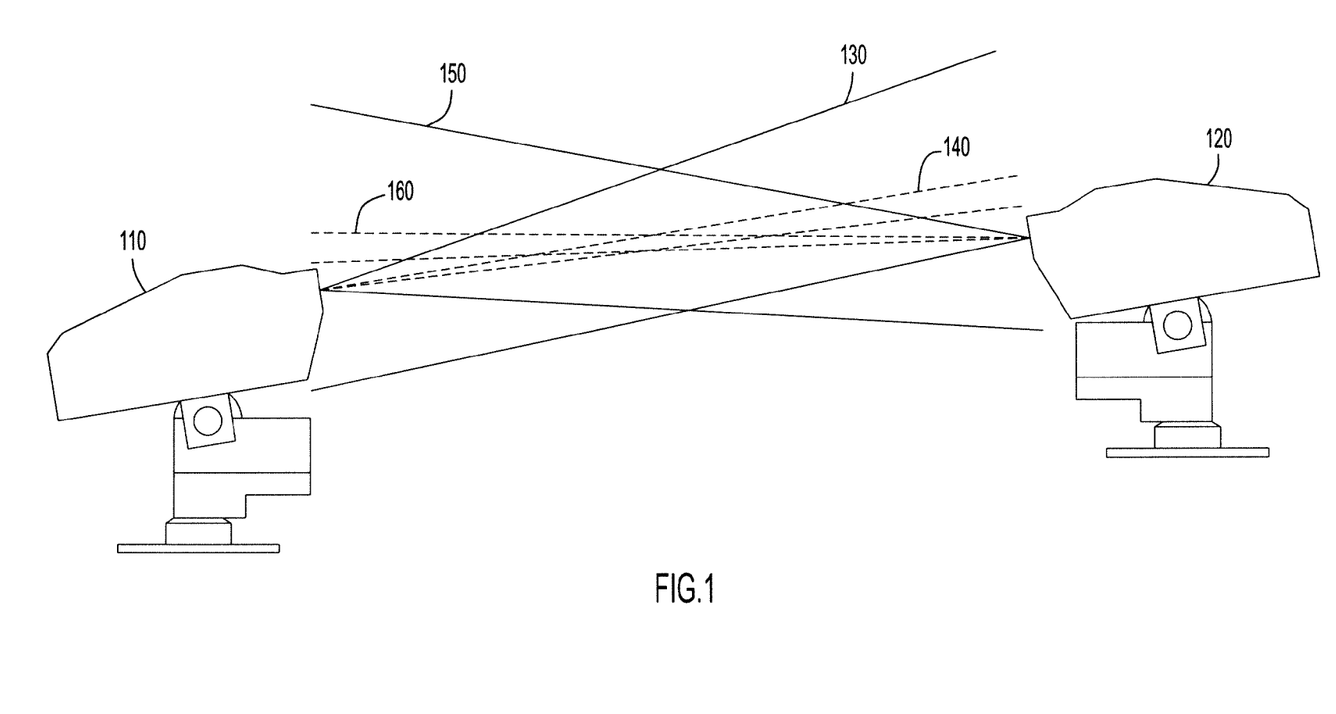
FIG. 1 is a diagram showing the simultaneous transmission of wide and narrow beacon laser beams between two terminals of an optical communication system.

FIG. 1 conceptually illustrates the simultaneous transmission of wide and narrow beacon laser beams between two optical communication terminals 110 and 120 of an optical communication system. In particular, terminal 110 simultaneously transmits toward terminal 120 a wide-beamwidth optical beacon laser beam 130 overlaid with a narrow-beamwidth optical beacon laser beam 140. Likewise, terminal 120 simultaneously transmits toward terminal 110 a wide-beamwidth optical beacon laser beam 150 overlaid with a narrow-beamwidth optical beacon laser beam 160. Note that the beamwidths shown in FIG. 1 are not to scale. The wide beacon laser beam has a divergence that essentially ensures a smooth handoff between initial acquisition and tracking with the narrow beacon laser beam. According to one implementation, the narrow beacon laser beam can have a beamwidth that is about the same as that of a data laser beam used to transmit data between terminals 110 and 120. According to another implementation, the data laser beam may have a fraction of the beamwidth of the narrow beacon laser beam, e.g., on the order of 0.15 to 0.35 milliradians. In this case, the broader divergence of the narrow beacon laser beam makes it easier to maintain track on a far-end terminal using the narrow beacon laser beam than it would be if using a split-off portion of the received data laser beam.

The wide beamwidth beacon signal allows fast acquisition because minimal or no scanning is required after pointing with the initial bearing information from the system. By covering a broader field, the wide beacon signal increases the likelihood of rapid detection. The divergence of the wide beacon signal can be set as wide as possible while still allowing enough signal strength for detection at the longest range specified by system requirements. The disadvantage of a wide beacon signal is that the signal-to-noise ratio (SNR) is less than that of a narrow beacon signal of comparable energy, because less of the energy is concentrated onto the position detector at the far-end terminal. In acquisition, this lower SNR can be acceptable as long as there is enough detected energy to permit accurate steering of the narrow beacon beam onto the position detector at the far-end terminal and thereby enabling transition into a tracking mode using the narrow beacon signal. Thus, for acquisition, the necessary SNR is lower than during tracking. By removing the need for a complicated scanning pattern, the acquisition time is reduced and acquisition of moving targets is more likely to occur.

The narrow beacon signal has a greater power density and therefore a larger SNR which equates to more precise tracking. For example, the narrow beacon signal can have a beamwidth that is about an order of magnitude narrower than the wide beacon signal, with a divergence of less than a milliradian, yielding about a 20 dB increase in the SNR of the narrow beacon signal at the position detector at the far-end terminal. The invention is not limited to any particular beam divergences or any particular ratio of divergences between the wide beacon signal and the narrow beacon signal. This added SNR also equates to the ability to continue tracking even in the presence of deep fades or at longer ranges. However, the narrow beacon signal has the disadvantage that the tolerance to pointing error due to platform motion is less than for a wider beam. Consequently, in a beacon system that switches between a wide and narrow beacon signal, tracking could be lost and the reacquisition sequence would need to be restarted. With simultaneous overlaid wide and narrow beacon signals, even if a pointing error causes the narrow beacon signal not to point at the far-end terminal, that terminal will still be illuminated with the wide beacon signal. Thus, the combined wide/narrow beacon signal approach shown in FIG. 1 provides a very high level of performance with all of the benefits and none of the disadvantages of both wide and narrow beacon signals.

Figure 2:
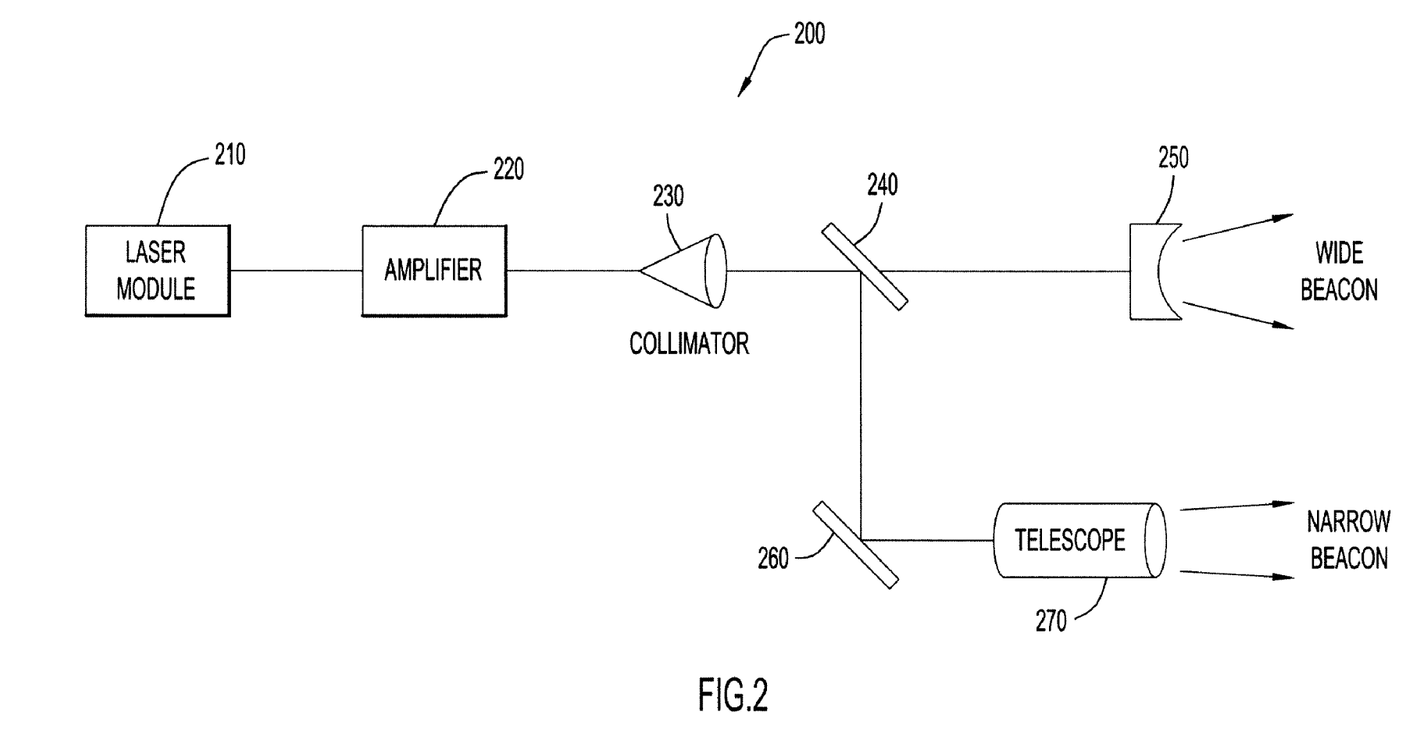
FIG. 2 is a block diagram of an example transmitter system for simultaneously generating wide and narrow beacon signals.

FIG. 2 is a block diagram of an example transmitter system 100 capable of generating simultaneous wide and narrow beacon signals in accordance with an embodiment of the invention. A laser module 210 generates an optical beacon signal at a wavelength $\lambda_B$. Laser module 210 can be a tunable laser seed module, such as a commercially available small form-factor pluggable (SFP) laser module, capable of producing an output beacon signal whose wavelength $\lambda_B$ is tunable. According to another implementation, laser module 210 can be non-tunable, producing a beacon laser beam having a fixed wavelength.

By way of example, the optical wavelengths used for transmitting the beacon laser beams can be in the eye-safe region of the spectrum (i.e., wavelengths longer than about 1.4 microns), such as wavelengths in the telecommunications C and L bands or between about 1530 nm and 1600 nm. These wavelengths permit commercially-available optical components to be used in the laser transceiver. Nevertheless, the invention is not limited to any particular range of optical wavelengths. Thus, as used herein and in the claims, the term "optical" refers generally to the range of wavelengths of electromagnetic signals within which "optical" equipment (e.g., optical communication equipment, transmitters, receivers, etc.) typically operates, including the visible spectrum, infrared wavelengths, and ultraviolet wavelengths.

The optical beacon signal generated by laser module 210 is supplied to an optical amplifier 220. As shown in FIG. 2, for example, where the output of laser module 210 is supplied via optical fiber, amplifier 220 can be implemented with a fiber amplifier, such as a single mode erbium-doped fiber amplifier. The amplified beacon laser signal is delivered via optical fiber to the focal plane of the transmit collimator 230. Laser energy exits the collimator as a free space 10 mm diameter beam, for example.

The beacon laser beam impinges on a beamsplitter 240 that splits the beacon laser beam into a first signal on a first path and a second signal on a second path. In the example shown in FIG. 2, beamsplitter 240 transmits a portion of the beacon laser beam to the first signal path toward the wide beacon optics and reflects a portion of the beacon laser beam to the second signal path toward the narrow beacon optics. The opposite arrangement can also be adopted in which the transmitted portion of the beacon laser beam is directed to the narrow beacon optics and the reflected portion of the beacon laser beam is directed to the wide beacon optics.

The portion of the beacon laser beam on the first signal path is supplied to diverging optics 250 for producing the wide beacon signal. For example, optics 250 can include a diverging lens that produces the required divergence for the wide beacon signal, which is then transmitted through an aperture toward the far-end terminal. The baseline divergence is set by the selection of the diverging lens which, for example, may be set as low as one milliradian to as high as two degrees for broader acquisition. During assembly, the wide beacon signal can be co-registered with the transmit data beam.

The portion of the beacon laser beam on the second signal path is supplied to optics for producing the narrow beacon signal. In the example shown in FIG. 2, the narrow beacon optics include steering optics 260 for steering a pointing direction of the narrow beacon beam to a selected line of sight and a telescope 270 that directs the narrow beacon signal into free space. The beam divergence of the narrow beacon signal transmitted by telescope 270 is less than the beam divergence of the wide beacon signal transmitted via wide beacon optics 250. The invention is not limited to any particular wide and narrow beacon optics and any suitable optical devices and arrangements can be used to produce the wide and narrow beacon signals.

Beamsplitter 240 can be a wavelength-dependent beamsplitter, such as a dichroic beamsplitter having a transmission/reflection characteristic that varies as a function of wavelength. More specifically, beamsplitter 240 can have a filter crossover band between wavelengths that are substantially completely transmitted (e.g., greater than 98% transmission) and wavelengths that are substantially completely reflected (e.g., greater than 98% reflection). Within the filter crossover band, laser energy is partially transmitted and partially reflected, with the proportion of transmitted to reflected energy varying as a function of wavelength. As the wavelength varies from one end of the filter crossover band to the other end, the transmission/reflection characteristic varies along a curve from substantially fully transmitting to substantially fully reflecting.

In order to have a wavelength-dependent beamsplitter transmit and reflect portions of the beacon laser beam, the wavelength $\lambda_B$ of the beacon laser beam can be selected to be in the filter crossover band. The transmission/reflection characteristic of the beamsplitter at the wavelength $\lambda_B$ will determine what fraction of the beacon laser energy is reflected and what fraction is transmitted, thereby controlling an allocation of energy between the wide beacon signal and the narrow beacon signal. Using this mechanism to simultaneously produce the wide and narrow beacon signals from the same beacon laser beam results in the wide and narrow beacon signals having the same signal characteristics, such as the same wavelength and the same modulation, if any.

As previously noted, laser module 210 shown in FIG. 2 can be a tunable laser module, such that the wavelength $\lambda_B$ of the beacon laser beam is selectable over a range of wavelengths. Within the filter crossover band of beamsplitter 240, changing the wavelength $\lambda_B$ shifts the point along the transmission/reflection characteristic curve. Consequently, laser module 210 can adjust the wavelength $\lambda_B$ of the beacon laser beam in order to adjust an allocation of the energy of the beacon laser beam in a controllable manner between the wide and narrow beacon signals. By driving the wavelength $\lambda_B$ to or past one end of the filter crossover band, substantially all (at least 98%) of the beacon laser beam energy can be directed to the wide beacon signal, and by driving the wavelength $\lambda_B$ to or past the other end of the filter crossover band, substantially all (at least 98%) of the beacon laser beam energy can be directed to the narrow beacon signal. Selecting a wavelength $\lambda_B$ within the filter crossover band will result in an energy allocation between these two extremes. Since the transmission/reflectance characteristic curve of beamsplitter 240 is known or can be measured, laser module 210 can be controlled to select a wavelength $\lambda_B$ that produces a desired energy allocation between the two beacon signals.

According to another implementation, laser module 210 can be non-tunable and produce a beacon laser beam at a fixed wavelength $\lambda_B$. In this case, the energy of the beacon laser beam can still be allocated as desired between the wide and narrow beacon signals by designing laser module 210 to produce laser light at a selected wavelength. However, the energy allocation between the wide and narrow beacon signal is fixed, since the wavelength cannot be adjusted. Optionally, in this implementation, beamsplitter 240 need not be wavelength dependent, although beamsplitter 240 must still split the beacon laser beam at the beacon wavelength $\lambda_B$ into two beams along the wide and narrow beacon signal paths with the desired energy allocation between the two beams.

Figure 3:
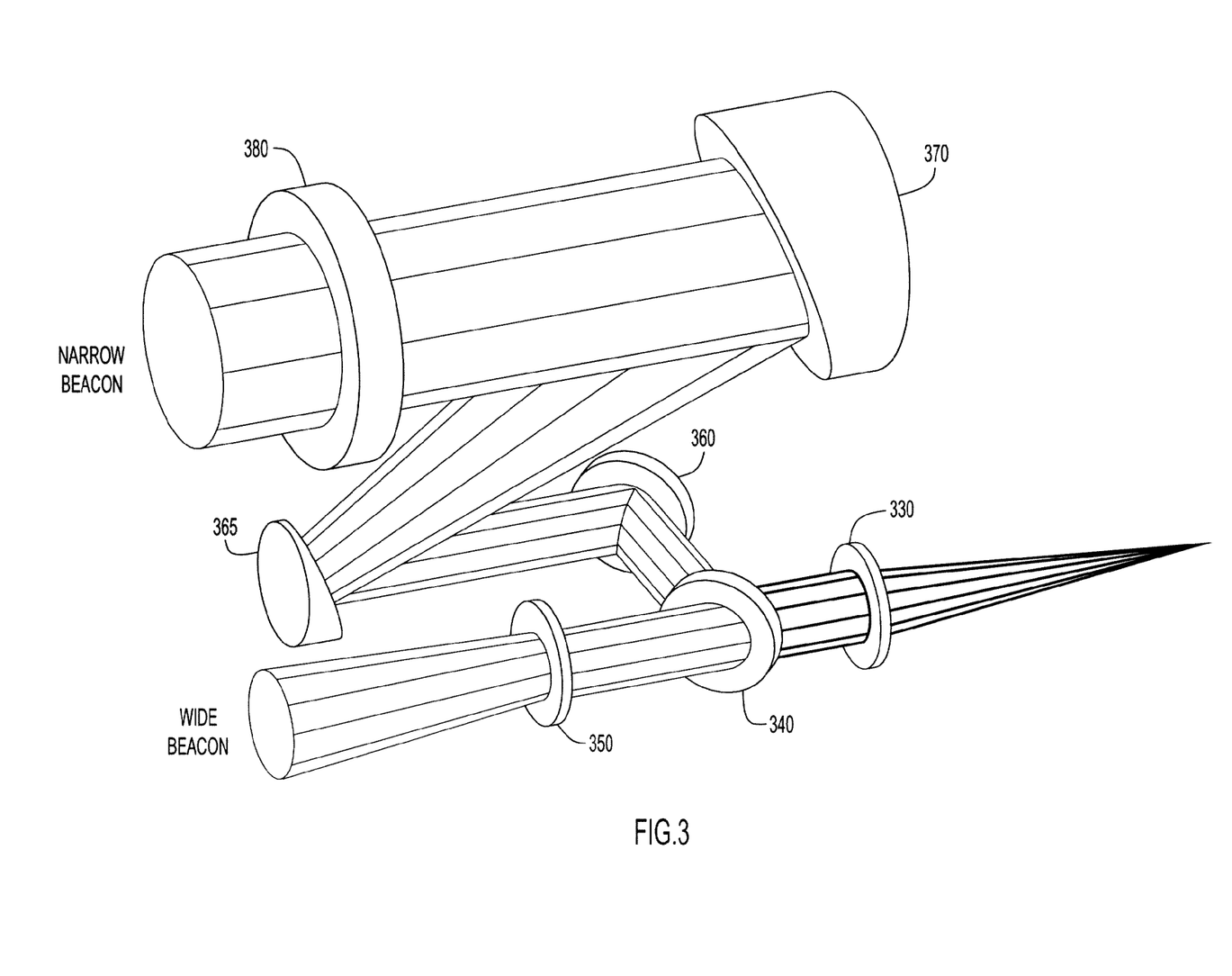
FIG. 3 is a block diagram illustrating an implementation of the transmitter optics of the transmitter system shown in FIG. 2.

FIG. 3 is a block diagram illustrating an implementation of the transmitter optics portion of the transmitter system shown in FIG. 2. A transmit collimator 330 receives the beacon laser signal from the end of the optical fiber (downstream of the amplifier) and produces a collimated beacon laser beam. The beacon laser beam issuing from collimator 330 is shown in thicker lines in FIG. 3 to indicate that the beacon laser beam contains the full energy of the beam at this point.

A beamsplitter 340, such as a partial dichroic minor transmits a portion of the beacon laser beam to a first (wide beacon) path and reflects a portion of the beacon laser beam to a second (narrow beacon) path. Note that the lines depicting the first and second signals transmitted and reflected by beamsplitter 340 are shown in lighter lines to indicate that each contains a portion of the beacon laser beam energy. Note that the invention is not limited to any particular implementation of the beamsplitter, and a variety of other mechanisms can be used to split the beacon laser beam. The signal transmitted along the wide beacon signal path impinges on a diverging lens 350 that produces the wide beacon signal with, for example, a 10 milliradian beamwidth.

A fast steering mirror 360 is disposed along the second signal path between beamsplitter 340 and telescope 370 and deflects the portion of the beacon laser beam reflected by beamsplitter 340 at a selected angle to control the angle at which the narrow beacon signal is transmitted by telescope 370. Fine steering can be accomplished by controlling fast steering mirror.

The laser beam deflected by fast steering mirror 360 is deflected by a second minor 365 to telescope 370 that operates as a beam expander in front of fast-steering minor 360. A 2× to 10× telescope may be suitable for telescope 370; however, the invention is not limited to any particular telescope expansion power. The resulting narrow beacon signal is transmitted through a window 380 into free space simultaneously with the wide beacon signal. As used herein and in the claims, the term aperture refers to any telescope, lens, minor, antenna or other mechanism for transmitting beams into free space.

Figure 4:
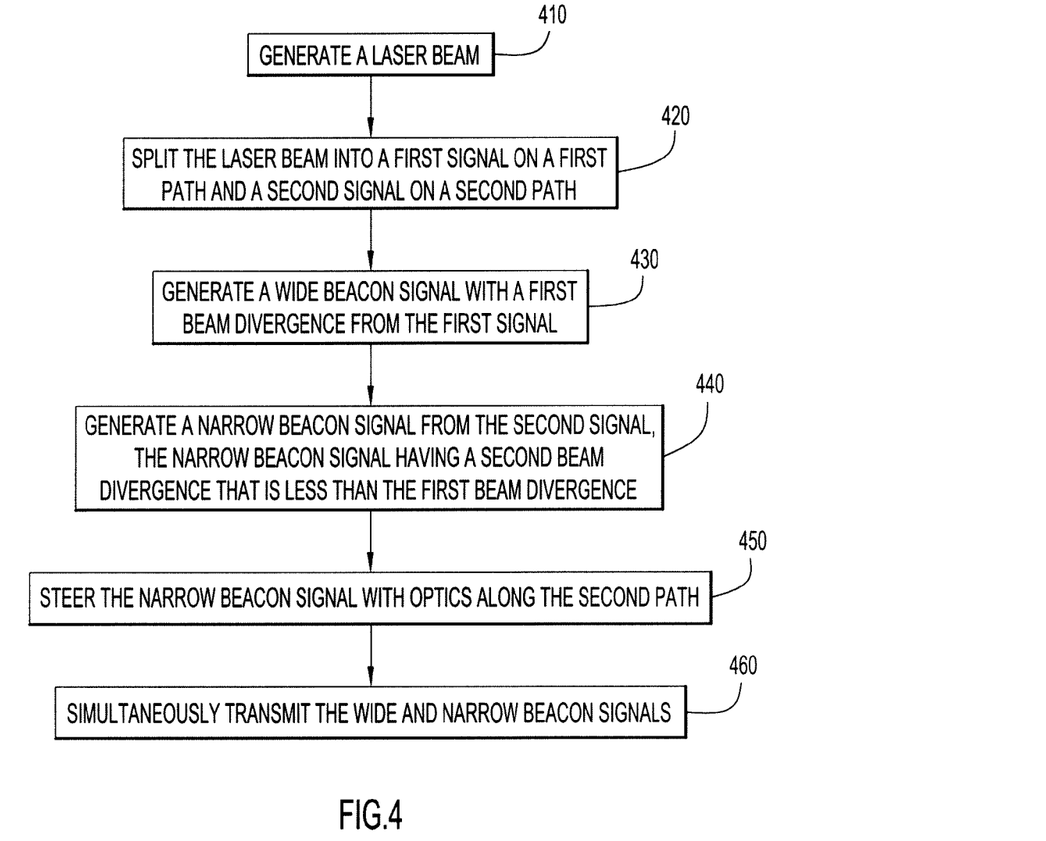
FIG. 4 is a functional flow diagram illustrating operations performed to generate simultaneous wide and narrow beacon signals according to an embodiment of the invention.

FIG. 4 is a functional flow chart summarizing the operations performed to simultaneously generate wide and narrow optical beacon signals, as described above in connection with FIGS. 1-3. In operation 410, a laser beam is generated, comprising a beacon signal at a wavelength $\lambda_B$. The laser beam is split, in operation 420, into a first signal on a first path and a second signal on a second path. A wide beacon signal with a first beam divergence is generated from the first signal using, for example, a diverging lens (operation 430). A narrow beacon signal is generated from the second signal, where the narrow beacon signal has a second beam divergence that is less than the first beam divergence (operation 440). Optionally, in operation 450, the narrow beacon signal is steered with optics (e.g., a fast steering minor) along the second path. In operation 460, the wide and narrow beacon signals are simultaneously transmitted into free space.

Optionally, the wide and narrow beacon laser beams can be modulated to facilitate detection and to simplify system design. For example, the beacon laser energy can be modulated on and off or "chopped" at a relatively low frequency (e.g., 4 to 15 kHz) to produce a square-wave signal whose modulation frequency can be detected. A unique beacon chopping frequency can be used for each terminal in an optical communication system, such that detection of the chopping frequency identifies which terminal is sending the beacon signal. The on/off modulation creates a square-wave AC signal that can be AC coupled to a position sensor detector in the far-end terminal. By AC coupling the position sensor detector, continuous signals that create a DC bias do not affect the detection process. It is also possible to modulate the beacon signal to encode data in the beacon signal. Regardless of whether the beacon laser beam is modulated or what modulation scheme is employed, the wide and narrow beacon signals have the same modulation (if any), since they are both generated from the common beacon laser beam supplied to the beamsplitter that separates the beam into wide and narrow beacon signals.

As previously explained, the beacon signals support acquisition and tracking of the angular position of optical communication terminals to permit reception of narrow data laser beams that are modulated to convey data. According to one option, the data signal can be handled by different transmitter optics and transmitted via a separate aperture. According to another option, the data signal can be contained in the same laser beam as the beacon signal. The data signal can have a different optical wavelength than the beacon signal, which is outside the filter crossover band of the beamsplitter, such that substantially all of the data signal's energy is either transmitted or reflected by the beamsplitter. For example, in the arrangement shown in FIG. 3, the data signal can be reflected by dichroic beamsplitter 340 toward fast steering minor 360, which steers both the data and narrow beacon signals. The data signal and narrow beacon signal are simultaneously transmitted via telescope 370.

The data signal can be used to transmit virtually any type of information or data including, but not limited to: sensor data, navigation signals, voice/audio signals, image signals, video signals, data relating to an application running on a processor, control signals, and overhead or communication protocol signals (e.g., relating to the communication protocol, handshaking, routing, equipment configuration, etc.). In particular, sensors that collect information for intelligence, surveillance, and reconnaissance generate a substantial amount of data and can benefit from the high data rates employed in optical communications to transmit the information in a reasonable amount of time.

The arrangement shown in FIG. 3 can also be used to support a modulated retro-reflector (MRR) mode where two terminals perform a half duplex operation and one of the terminals does not create any laser energy. In this mode, the transmitting terminal can send data by modulating the transmitted data laser beam. The MRR terminal reflects the incoming signal back to the transmitting terminal. To send data from the MRR terminal to the transmitting terminal, the transmitting terminal transmits an unmodulated signal. The unmodulated signal is incident on the MRR terminal, where a quantum well modulator (QWM) applies a data modulation to the beam, and the MRR terminal reflects the modulated signal back toward the transmitting terminal. The wavelength of the laser in the transmitting terminal is tunable to accommodate the wavelength temperature shift of the QWM used in the MRR terminal.

The transmitter system for generating wide and narrow beacon signals described herein can be employed in an optical (e.g., laser) communication terminal designed to operate in a laser communication system with moving platforms, where the relative positions of terminals change over time. The system can include, for example, terminals mounted on airborne platforms, satellites, ships, watercraft, or ground vehicles, as well as stationary terminals that communicate with terminals mounted on moving platforms (e.g., combinations of air-to-air and air-to-ground links).

Having described preferred embodiments of a new and improved technique for simultaneously transmitting wide and narrow optical beacon signals, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of simultaneously transmitting wide and narrow optical beacon signals, the method comprising:
generating a laser beam that includes a data signal at a first wavelength and a beacon signal at a second wavelength;
splitting the laser beam into a first signal on a first path and a second signal on a second path, the first signal including a first portion of the beacon signal and the second signal including a second portion of the beacon signal and substantially all of the data signal;
generating a wide beacon signal from the first portion of the beacon signal, the wide beacon signal having a first beam divergence;
generating a narrow beacon signal from the second portion of the beacon signal, the narrow beacon signal having a second beam divergence that is less than the first beam divergence; and
simultaneously transmitting the wide and narrow beacon signals and the data signal.

2. The method of claim 1, wherein splitting the laser beam comprises:
directing a portion of the laser beam to the first path via one of transmission and reflection of the laser beam; and
directing a portion of the laser beam to the second path via the other of transmission and reflection of the laser beam, wherein the first and second signals have a same wavelength.

3. The method of claim 1, further comprising:
steering the narrow beacon signal via optics disposed along the second path.

4. The method of claim 1, wherein the wide and narrow beacon signals have a same modulation and a same wavelength.

5. The method of claim 1, wherein:
the laser beam is generated with a fixed wavelength; and
the laser beam is split such that the fixed wavelength determines an allocation of signal energy between the wide beacon signal and the narrow beacon signal.

6. A method of simultaneously transmitting wide and narrow optical beacon signals, the method comprising:
generating a laser beam with a tunable wavelength;
splitting the laser beam into a first signal on a first path and a second signal on a second path;
generating a wide beacon signal from the first signal, the wide beacon signal having a first beam divergence;
generating a narrow beacon signal from the second signal, the narrow beacon signal having a second beam divergence that is less than the first beam divergence, wherein an allocation of energy between the wide beacon signal and the narrow beacon signal is adjustable by adjusting a wavelength of the laser beam; and
simultaneously transmitting the wide and narrow beacon signals.

7. An optical transmitter system for simultaneously transmitting wide and narrow optical beacon signals, comprising:
a laser module configured to generate a laser beam;
a wavelength-dependent beamsplitter having a filter crossover band between substantially reflected wavelengths and substantially transmitted wavelengths and configured to split the laser beam into a first signal on a first path and a second signal on a second path;
diverging optics disposed along the first path and configured to generate a wide beacon signal by applying a first beam divergence to the first signal;
steering optics disposed along the second path and configured to steer the first signal to produce a narrow beacon signal along a selected line of sight, the narrow beacon signal having a second beam divergence that is less than the first beam divergence, wherein the laser beam includes energy at a beacon wavelength that is in the filter crossover band such that the beacon wavelength determines an allocation of energy between the wide beacon signal and the narrow beacon signal based on a transmission/reflection characteristic of the wavelength-dependent beamsplitter at the beacon wavelength; and
at least one aperture for simultaneously transmitting the wide and narrow beacon signals.

8. The system of claim 7, wherein the laser module is a tunable laser module capable of adjusting the allocation of energy between the wide beacon signal and the narrow beacon signal by adjusting a wavelength of the laser beam.

9. The system of claim 7, wherein the laser module generates the laser beam at a fixed wavelength.

10. The system of claim 7, wherein:
the laser beam further includes a data signal at a data wavelength outside the filter crossover band such that substantially all of the data signal's energy is directed to the second signal path; and
the system simultaneously transmits the data signal along with the wide and narrow beacon signals.

11. The system of claim 10, wherein the wide beacon signal is transmitted via a first aperture and the narrow beacon signal and the data signal are transmitted via a second aperture.

12. The system of claim 7, wherein the steering optics comprise a fast steering minor.

13. The system of claim 7, wherein the wide and narrow beacon signals have a same modulation and a same wavelength.

14. An optical transmitter system for simultaneously transmitting wide and narrow optical beacon signals, comprising:
means for generating a laser beam that includes a data signal at a first wavelength and a beacon signal at a second wavelength;
means for splitting the laser beam into a first signal on a first path and a second signal on a second path, the first signal including a first portion of the beacon signal and the second signal including a second portion of the beacon signal and substantially all of the data signal;
means for generating a wide beacon signal from the first portion of the beacon signal, the wide beacon signal having a first beam divergence; and
means for generating a narrow beacon signal from the second portion of the beacon signal, the narrow beacon signal having a second beam divergence that is less than the first beam divergence, wherein the means for generating the wide and narrow beacon signals simultaneously transmit the wide and narrow beacon signals into free space along with the data signal.

15. The system of claim 14, wherein the means for splitting comprises:
means for directing a portion of the laser beam to the first path via one of transmission and reflection of the laser beam and for directing a portion of the laser beam to the second path via the other of transmission and reflection of the laser beam, wherein the first and second signals have a same wavelength.

16. The system of claim 14, wherein the wide and narrow beacon signals have a same modulation and a same wavelength.

17. An optical transmitter system of for simultaneously transmitting wide and narrow optical beacon signals, comprising:
means for generating a laser beam, wherein the means for generating the laser beam is tunable;
means for splitting the laser beam into a first signal on a first path and a second signal on a second path;
means for generating a wide beacon signal from the first signal, the wide beacon signal having a first beam divergence; and
means for generating a narrow beacon signal from the second signal, the narrow beacon signal having a second beam divergence that is less than the first beam divergence, wherein an allocation of energy between the wide beacon signal and the narrow beacon signal is adjustable by adjusting a wavelength of the means for generating the laser beam and the means for generating the wide and narrow beacon signals simultaneously transmit the wide and narrow beacon signals into free space.

\* \* \* \* \*

UNITED STATES PATENT AND TRADEMARK OFFICE
CERTIFICATE OF CORRECTION

PATENT NO. : 8,295,706 B2
APPLICATION NO. : 12/776941
DATED : October 23, 2012
INVENTOR(S) : James A. Cunningham et al.

It is certified that error appears in the above-identified patent and that said Letters Patent is hereby corrected as shown below:

Column 5, line 51, replace "partial dichroic minor" with -- partial dichroic mirror --.

Column 6, line 5, replace "a second minor" with -- a second mirror --;

line 6, replace "of fast steering minor" with -- of fast-steering mirror --;

line 12, replace "lines, minor, antenna" with -- lens, mirror, antenna --;

line 27, replace "fast steering minor" with -- fast steering mirror --; and line 64, replace "fast steering minor" with -- fast steering mirror --.

Column 9, line 12, replace "fast steering minor" with -- fast steering mirror--.

Signed and Sealed this
Fifteenth Day of January, 2013

David J. Kappos
*Director of the United States Patent and Trademark Office*